Oct. 8, 1935.  W. McL. ROSBOROUGH  2,016,296
METHOD OF MAKING CASTELLATED OR SLOTTED NUT BLANKS OR THE LIKE
Original Filed Dec. 31, 1931  2 Sheets-Sheet 1
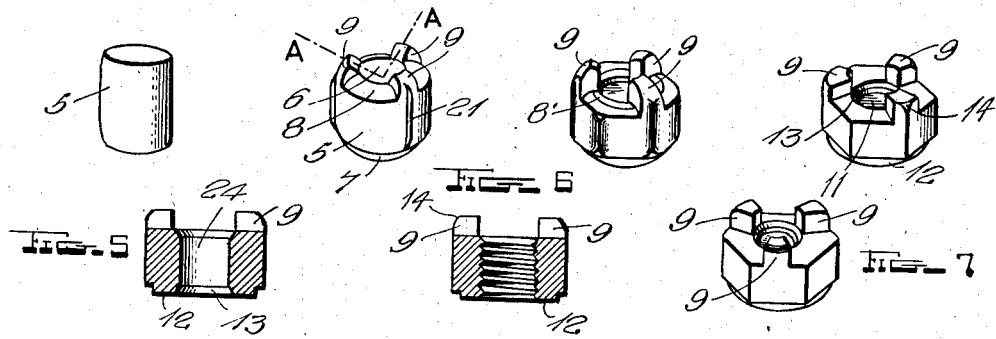
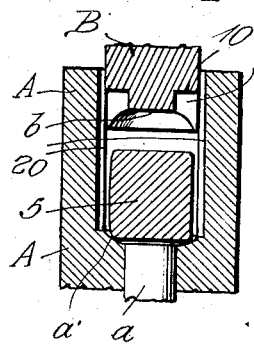
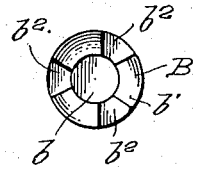
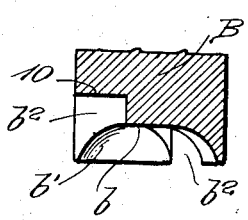
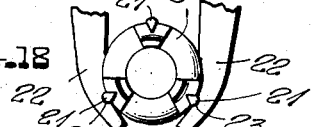
INVENTOR.
William McLure Rosborough,
BY
ATTORNEYS.

Oct. 8, 1935.   W. McL. ROSBOROUGH   2,016,296
METHOD OF MAKING CASTELLATED OR SLOTTED NUT BLANKS OR THE LIKE
Original Filed Dec. 31, 1931   2 Sheets-Sheet 2
FIG_19   FIG_20   FIG_21   FIG_22
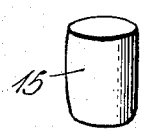
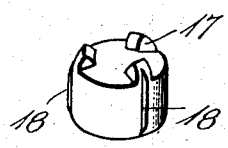
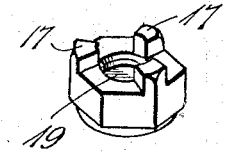
FIG_23   FIG_24   FIG_25   FIG_26
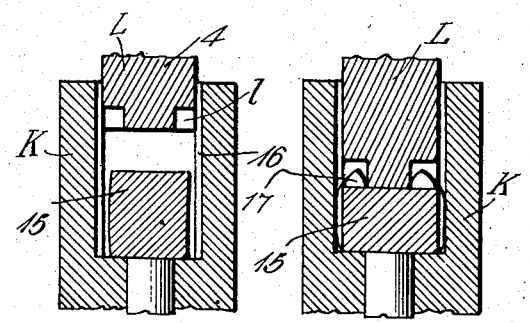
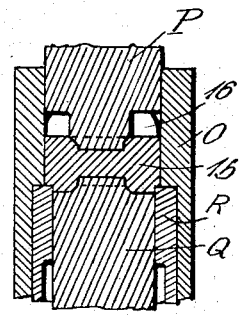
FIG_29
FIG_27
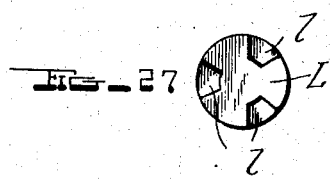
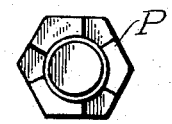
FIG_28
FIG_30   FIG_31   FIG_32
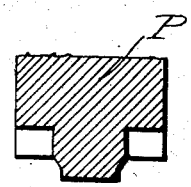
INVENTOR.
William McLure Rosborough,
BY
ATTORNEYS.

Patented Oct. 8, 1935

2,016,296

UNITED STATES PATENT OFFICE 2,016,296

METHOD OF MAKING CASTELLATED OR SLOTTED NUT BLANKS OR THE LIKE

William McLure Rosborough, Charlotte, N. C.

Application December 31, 1931, Serial No. 584,241
Renewed January 7, 1935

12 Claims. (Cl. 10—86)

My present invention relates to a process of manufacturing castellated, slotted and similar nuts by a process in which the locking lugs are partially formed by deforming portions of the blank other than those portions which are to form the lugs in the finished nut, and partially formed by extruding the metal, or in other words, a combined process of pressing and extrusion, the metal preferably being worked in a cold condition; the mechanisms utilized in the formation of the nut, and to the nut so manufactured.

One of the principal objects of my invention is to provide a method whereby the lugs are formed during various stages to a greater height than required in the finished nut, and are then compressed to square off the tops of the lugs, and to bring them into shape corresponding to that found in the conventional castellated nuts.

Another object of the invention is to form the blank at one of its stages with fins which may be utilized in centering the blank in a die for a subsequent operation, and in keeping the lugs of the blank lined up with the recesses in the die utilized in the succeeding operation.

Another object of my invention is to provide a method whereby the blank is formed in a series of succeeding steps during the course of which it is gradually compressed longitudinally and expanded diametrically while the locking lugs are simultaneously compressed and/or extruded to successively greater heights (save for the last step in which the lugs are compressed and squared off) and during which also the blank is transformed by degrees from a circular shape to a hexagonal shape.

Other objects of my invention will appear as the description proceeds.

In the drawings which illustrate some of the methods by which the invention can be carried out,—

Figures 1 to 6 represent stages in the formation of a nut, beginning with the blank in Figure 1, and terminating with the finished nut in Figure 6, Figures 1 to 4 being in perspective, and Figures 5 and 6 being sectional views.

Figure 7 represents a perspective view of a nut in which the locking lugs are located at the side walls rather than at the corners of the blank.

Figures 8, 9, 10 and 11, represent fragmentary vertical sectional views taken through the forming mechanisms utilized in manufacturing a nut, the blank being shown in position in the forming mechanisms, the sections being taken along intersecting planes, as indicated by the broken line A—A of Figure 2.

Figures 12, 13 and 14 represent plan views of the working faces of the punches illustrated, respectively, in Figures 9, 10 and 11.

Figures 15, 16 and 17 represent enlarged fragmentary vertical sectional views through the punches.

Figure 18 represents a diagrammatic face view of the blank positioned in the fingers of a transfer mechanism.

Figures 19, 20, 21 and 22 represent views in perspective showing the stages of formation of a nut blank according to a variation of my invention.

Figures 23, 24, 25 and 26 represent vertical sectional views corresponding to Figures 8 to 11, inclusive, showing forming mechanisms for manufacturing the blank according to the variations of my invention, the blank being shown in the mechanisms during the various stages of formation.

Figures 27, 28 and 29 represent plan views of the working faces of the punches illustrated in Figures 24, 25 and 26, respectively, and Figures 30, 31 and 32 represent fragmentary vertical sectional views on an enlarged scale, of the punches illustrated in Figures 27, 28 and 29, respectively, the sections being taken along intersecting planes through intersecting planes passing through adjacent recesses provided in the punches.

Referring more particularly to Figures 1 to 17, inclusive, of the drawings, a slug or blank 5 of suitable dimensions is cut by suitable means (not shown) from a length of stock, and is placed in a die A, the inside diameter of which is somewhat in excess of the outside diameter of the slug or blank 5, as shown in Figure 8. The die is cylindrical in form, and is provided with longitudinally extending grooves 20 which may be substantially semi-circular in form and which register with the lug-forming recesses in the punch B. The grooves are of such depth that the inside radius of the die measured to the bottom of a slot is the same as the inside radius of the die C (used in the succeeding step in the formation of the blank) measured to the line of intersection of adjacent sides of the die C. The die is provided with a knockout pin $a$, the inner end of which is flat and in its normal position coincides with the inner edges of the bottom concave face $a'$ of the die. The die is of sufficient depth to receive the blank 5, and after the blank is in place in the die, a punch B enters the die A, engages the blank 5 and compresses the latter longitudinally, and expands it diametrically so as to compress it against the sides and bottom of the die and against the knockout pin, as shown in Figure 9.

The blank 5 may be placed in the die in the same condition in which it is cut from the stock, and if so, it may be somewhat distorted from a true cylindrical shape, due to the action of the mechanism which severs it. As it is acted upon by the punch B however, the sides of the blank acquire the cylindrical shape of the die A, with fins 21, as illustrated in Figure 2, formed on it by metal being pressed out into the grooves. The top of the blank will also be squared with reference to the axis of the blank as at 6, and the central portion of the bottom of the blank will likewise be squared, and the remainder of the bottom will be given an arcuate or curved formation as at 7.

It will be observed that the punch B is provided on its end face with a central flat area $b$, for squaring up the blank, and with an arcuate or curved surface $b'$ for imparting an arcuate or curved surface 8 to the upper face of the blank. Further, the punch is provided with a series of radially disposed substantially wedge-shaped recesses $b^2$ which are substantially co-extensive in length radially of the punch with the width taken radially of the curved surface $b'$ thereof, and such recesses are provided for allowing distortion of the blank to take place as the punch enters deeper into the die without compressing the areas of the blank which coincide with the recesses, whereby to allow the metal of the blank at the points where the recesses in the punch occur to enter such recesses to thereby initiate the formation of the locking lugs 9 of the nut blank. The entry of the metal into the recesses is due, I believe, not only to the compression of the metal of the blank other than that which coincides with such recesses, but also to an extruding action due to the blank being confined within the die on all surfaces save those portions over which the recesses in the punch occur. The recesses are of sufficient depth longitudinally of the punch to allow the metal to enter them without engaging the bottom walls 10 of the recesses, so that no obstruction is afforded to the entry of the metal into the recesses as far as it will naturally go under the pressure to which the blank is subjected, and therefore the compression of the metal of the blank finds relief without danger of breaking the die.

It will be observed that though the blank or slug 5 when introduced into the die may not have its axis exactly centered with reference to the die axis, the arcuate shape of the punch face and of the die bottom will serve to sufficiently center the blank as the punch begins the compression operation.

The blank having been formed in the die A, the punch is withdrawn, the knockout pin $a$ is actuated, and the blank is forced out of the die to be engaged by suitable mechanism, known in the art, for transferring the blank from the die A to the next operation.

The latter takes place in the die C under the action of the punch D. The die C is of greater diameter than the die A, and its side walls instead of being cylindrical are of hexagonal arrangement, except for the junctions of the faces of the sides which are rounded off rather than truly angular, thereby giving the side walls of the die a modified hexagonal formation, the interior faces of the die corresponding to the sides of the punch D, as shown in Figure 13.

The blank is placed in the die C, with the fins 21 aligning with lines of intersections of adjacent sides of the die, and since the radius of the blank measured to the outer edge of a fin is equal to the inside radius of the die C at a line of intersection of adjacent sides, as explained above, the blank will be properly centered with its axis coinciding with the axis of the die. It will also be noted that since the fins 21 are lined up with the locking lugs 9 of the blank in a fixed relationship, this can be utilized in lining the blank up for introduction into the die C, so that the lugs on the blank will coincide with the lug-forming recesses $d'$ in the punch D, by having the transfer mechanism provided with means to be engaged by the ribs when the blank is moved out of the die A, and which will keep the blank from turning as it is transferred from the die A to the die C. Consequently the blank will be placed in the die C with the locking lugs coinciding with the recesses in the punch D. As illustrative of one method in which the fins may be utilized in keeping the blank from turning during the transfer movement, I have shown in Figure 18, a diagrammatic illustration of fingers 22 of the transfer mechanism provided with slots 23 engaged by the fins 21 of the blank, and holding the latter against turning during its transfer from the die A to the die C. As the transfer mechanism except for the provision of the slots is known in the art it is not necessary to illustrate it more in detail.

The die C is provided with a knockout pin $c$, and I may, if desired, provide means whereby the pin may assist in centering the blank with reference to the die C (particularly in cases where I may form the die A without the slots 20, and consequently form the blank without the projecting ribs 21). This means may take the form of an enlarged portion $c'$ on the knockout pin, forming in conjunction with a shoulder $c^2$, a stop which maintains the inner end of the knockout pin raised slightly above the bottom wall of the die, a spring $c^3$ being arranged back of the enlarged portion $c'$, which spring, after a blank has been forced out of the die under the action of the knockout pin, retains such pin in its outer position substantially flush with the top of the die C, until the next blank is brought by the transfer mechanism into axial alignment with the die, and until the punch D has started its movement toward the die, and has engaged the blank, and pinched it between the knockout pin and the punch. As the blank moves into the die against the action of the spring, it will be maintained between the knockout pin and punch in a properly centered position with reference to the die.

The blank having been placed in the die C, under the pressure of the punch D, it is further compressed longitudinally, and expanded diametrically to shape the blank to the die and to impart to the bottom face of the blank a flattened portion around the knockout pin which merges with a curved or arcuate portion forming the border of the lower face of the blank, and to further compress and/or extrude the metal forming the lugs 9 from the blank. In this operation also, the fins 18 disappear, being merged into the metal of the blank. At those portions of the blank where the fins are located they help build up the blank to fill the modified corners of the die, and may also assist in building up the outer faces of the locking lugs. It will be observed that the recesses $d'$ provided in the face of the punch D, are of sufficient depth longitudinally of the punch to avoid any obstruction to the entry into the recesses of the metal forming the lugs, thereby providing relief from the pressure exerted upon the die, and also allowing the lugs to be compressed and/or extruded to the full height naturally assumed under the pressure, and to be formed with a greater height than they will have in the finished blank. The punch D is provided with an extension $d^2$, which may be bevelled, and which, in co-operation with the bevelled end of the knockout pin c which projects above the bottom of the die, initiates the formation of the web center of the blank which is completed in the succeeding operation by the formation of depressions in the upper and lower faces of the blank. These projections aid the work of the punch in expanding the metal of the blank laterally and compressing it longitudinally.

Surrounding the projection $d^2$ of the punch D, is a flat surface $d^3$ which merges with the curved or arcuate surface $d^4$ into which the outer borders of the punch face are formed. The flattened portion of the punch compresses the inner portion of the arcuate surface 8 of the blank shown in Figure 2, and flattens it down into substantially the formation shown at 8' in Figure 3, thus aiding in increasing the height of the locking lugs 9, and at the same time aiding in the longitudinal compression and diametrical expansion of the blank into the larger size obtained in this operation. It will be noted that the action of the punch in this operation converts the blank from the cylindrical condition of Figure 2 into the modified hexagonal condition of Figure 3 by forcing the metal of the blank out and compressing it against the side walls of the die C.

Not only are the die and punch in this operation of larger diameter than the die and punch of the first operation, but also the radius of the punch to the inner walls of the lug forming recesses is greater than in the punch of the first operation, (i. e., the diameter of projection $d^2$ of punch D is greater than the diameter of flat b of punch B) and hence as the punch D engages the lugs initially formed in the first operation, it straightens them up and wedges them outwardly to bring them into the condition substantially as shown in Figures 3 and 10.

The blank having been formed in the die C, the punch is withdrawn and the blank forced out by the knockout pin to be engaged by the transfer mechanism and moved into alignment with the succeeding die E, in which the third operation in the formation of the blank is performed. Such die has the outer and inner co-operating punches F and G, the inner punch G working in a block H. The die E is fully hexagonal, corresponding in form to the punch F, while the punch G is cylindrical and corresponds in shape with the inner wall of the block H. The diameter of the die E corresponds to that of the die C, and when the blank is compressed between the punches F and G, the metal of the blank is forced out to fill up the corners of the die, and the central portion of the blank is compressed by the extensions f and g, of the punches F and G, respectively, so as to form a web 11 which, in a subsequent operation may be removed by drilling, punching or otherwise to form the opening in the nut blank so as to place the blank in the condition illustrated in Figure 5. The blank is then tapped to complete the nut, as shown in Figure 6. The upper edge of the punch G around the extension g, may terminate if desired, below the upper edge of the block H, to thereby form a washer face 12 on the lower face of the blank. The extensions f and g of the punches are preferably bevelled as at f' and g', respectively, in order to form bevelled faces such as 13 on the blank at the ends of the opening therein formed when the web is removed.

The punch F is provided with recesses $f^2$ for receiving the locking lugs of the blank, the depth of such recesses, however, being less than the height of the lugs formed on the blank in the second operation illustrated in Figure 10, so that the lugs are compressed by the punch and the metal thereof moved outwardly toward the walls of the die, the outer walls of the lugs in this manner being straightened, and the tops of the lugs being squared off to assume the position substantially shown in Figure 4. It will be noted, however, that the depth of the recesses is so regulated that the metal of the lugs will not be forced out completely, but there will be left a space at the outer corners of the recesses into which the metal is not completely forced, thereby affording relief for the strain imposed upon the die, and at the same time allowing the locking lugs to have a rounded and finished appearance at their upper outside edges, as indicated at 14.

The blank in the formation imparted to it by the operation under discussion has the lugs offset outwardly from the circumference of the opening 24 (see Fig. 5) which is formed when the web is removed, thereby providing a clearance on the inner faces of the lugs so that when the blank is tapped as shown in Figure 6, no threads will be formed on such faces. This is of advantage, because, where the lugs as well as the body of the blank are tapped, it often occurs that the tap chatters, due to the fact that the lugs strike the flutes of the tap, and consequently imperfect threads are formed. Further, if the lugs were threaded they would give slightly under the action of the tap so that threads of less depth would be cut in them than in the body of the nut. Should the lugs spring back to normal position after the removal of the tap the threads of the lug would grip the threads of a bolt or gauge with a binding action, and to a greater extent than the threads in the body portion of the nut, thus preventing the nut from falling within the tolerance limits and making it necessary to discard it. It will be understood, however, that I may, if desired, form the nut with lugs that extend inwardly to a depth sufficiently to be tapped when the blank is tapped, by increasing the radial depth of the lug-forming recesses $f^2$ in the punch F.

The lower face of the punch F, surrounding the projection f is flat as at $f^3$, so as to complete the flattening of the upper face of the blank occurring between the lugs, and similarly the face of the inner punch G, surrounding its projection g is flat so as to provide a flattened surface for the washer face.

While I have illustrated in Figures 1 to 4, inclusive, the stages of the formation of a nut blank with the locking lugs arranged at corners of the blank, as is usual with the conventional castellated or slotted nut, I may depart from this conventional arrangement and form such lugs at sides of the blank rather than at corners thereof, as shown by the blank illustrated in Figure 7, the process I have described being equally applicable to the formation of a nut such as shown in Figure 7. By locating the locking lugs at the sides, rather than at the corners of the blank, the metal forming the lugs is subjected to less distortion than would be the case were the lugs located at the corners, since in the latter event the outside faces of the lugs assume angular forms corresponding to the intersecting side walls of the die, whereas by locating them at the sides, the metal is free to flow substantially straight along the side walls of the die without the necessity of being additionally forced into angular formation. Hence, lugs arranged at the sides may be of greater strength than those arranged in the angles. However, for all usual purposes the practice of arranging the lugs at the angles may be followed. It will be of course understood that to arrange the lugs at the sides rather than at the angles, it is only necessary to form the punches with the lug-forming recesses opening at the sides rather than at the corners of the punches.

It will be understood, from what has heretofore been said, that the fins may be formed at what will be corners of the blanks, even though the lugs may be arranged at the sides, and hence, the fins need not necessarily align with the lugs. It wil also be noted that while three fins have been illustrated, the number of fins used may correspond to the number of corners with which the blank will be formed.

In Figures 19 to 32, inclusive, I have illustrated a method and means of forming a castellated nut in which the upper and lower faces of the blank are kept flat and parallel to each other throughout the process of formation. Mechanism on the same order as that illustrated in Figures 8 to 17, inclusive, is used in this variation of my process. In this modification of the process, the blank 15 is placed in the die K, which has a flat bottom and circular walls and may be provided with the grooves 16 and is acted upon by the punch L, to bring the blank in the condition shown in Figure 20, such punch having a flat working face, except for the recesses l, which allow for the initiation of the formation of the locking lugs 17. Under the action of the punch L, the blank is compressed longitudinally and expanded laterally to fill up the die K, and to start the locking lugs 17 and form the fins 18. The blank is then transferred to the die M, which is of modified hexagonal formation and of greater diameter than the die K, and is acted upon by the punch N, to further compress the blank longitudinally and expand it diametrically, and to complete the extrusion of the locking lugs, and also to initiate the formation of the web 19. The bottom wall of the die M, and the face of the punch N, except for the recesses n, are flat as with the die and punch K and L, respectively.

The blank is then transferred to the die O, where it is acted upon by the punches P and Q to finish the formation of the blank save for the removal of the web. The shapes of these punches correspond to those of the punches F and G of Figure 11, and similarly the die O and the block R correspond to the die E and block H of Figure 11, and these parts act upon the blank in the same manner as has been heretofore described.

While I have shown the blanks as being provided with three locking lugs, it will be understood that I do not intend to limit the invention to such arrangement, but may form them with any desired number of lugs. It will also be understood that while I have described the formation of hexagonal blanks, my process may be used in making blanks of other shapes.

The foregoing description has been given for the purposes of clearness of understanding of the invention, and no undue limitations should be deduced therefrom, but the claims should be construed as broadly as permissible, in view of the prior art.

Having thus described my invention what I claim as new, and desire to secure by Letters Patent is:—

1. The method of making a castellated nut blank comprising shaping a blank to provide a curved surface on one face thereof and simultaneously initiating the formation of the locking lugs on the curved surface, then compressing all portions of the blank save for the locking lugs, while simultaneously extruding metal to build up the locking lugs to a height greater than they will occupy in the finished blank and simultaneously flattening a portion of the said curved surface, then compressing the blank to shape it to its finished configuration and completing the flattening of said curved surface while simultaneously compressing the locking lugs and reducing their height to that occupied by them in the finished blank.

2. The method of making a castellated nut blank comprising shaping a blank to provide a curved surface on one face thereof and simultaneously initiating the formation of the locking lugs on said curved surface, then compressing the blank save for the locking lugs, and extruding the latter to a height greater than they will occupy in the finished blank while simultaneously imparting a modified hexagonal shape to the blank, then further compressing the blank and imparting a fully hexagonal shape thereto while simultaneously compressing the locking lugs and reducing them to the height they will occupy in the finished blank.

3. The method of making a castellated nut blank comprising shaping a blank and simultaneously initiating the formation of the locking lugs, then compressing all portions of the blank save for the locking lugs and simultaneously extruding metal to build up the locking lugs to a height greater than they will occupy in the finished blank while imparting to the blank a modified hexagonal formation, then further compressing the blank and imparting thereto a finished hexagonal formation while simultaneously compressing the locking lugs and reducing their height to that occupied by them in the finished blank.

4. The method of making a castellated nut blank comprising shaping a blank and simultaneously initiating the locking lugs of the nut, then further compressing the blank and extruding metal to build up the lugs to a height greater than they will occupy in the finished blank, then further compressing the blank and shaping it to its finished form while simultaneously compressing the locking lugs and reducing their height to that occupied by them in the finished blank.

5. The method of making a castellated nut blank comprising shaping a blank in stages while simultaneously building up by stages the locking lugs of the blank to a height greater than that occupied in the finished blank, then finishing the formation of the blank while simultaneously compressing the metal of the locking lugs and reducing their height to that occupied by them in the finished blank.

6. The method of making a castellated nut blank comprising shaping a blank and simultaneously initiating the formation of the locking lugs, compressing the blank and extruding metal to build the locking lugs up to a height greater than that occupied in the finished blank, and further compressing the blank and the locking lugs and reducing the height of the latter to that occupied by them in the finished blank.

7. The method of making a castellated nut blank comprising shaping a blank and simultaneously initiating the formation of the locking lugs and the formation of fins in registration with the locking lugs, transferring the blank to a shaping mechanism, and centering the blank in such mechanism by the fins, compressing the blank and extruding metal to build up the locking lugs to a height greater than they will occupy in the finished blank while compressing the metal of the fins to merge with that of the blank, and compressing the locking lugs and reducing their height to that occupied by them in the finished blank.

8. The method of making a castellated nut blank comprising shaping a blank and simultaneously initiating the formation of the locking lugs and the formation of centering fins, compressing the blank and merging the metal of the fins into that of the blank and extruding the locking lugs to a height greater than they will occupy in the finished blank, and compressing the blank to its finished form and reducing the height of the locking lugs to that they will occupy in the finished blank.

9. The method of making a castellated nut blank comprising shaping a blank and simultaneously initiating the locking lugs of the nut, compressing the blank and extruding the lugs to a height greater than that they will occupy in the finished blank, and reducing the height of the locking lugs to that they will occupy in the finished blank.

10. The method of making a nut blank comprising initially shaping a blank and forming centering fins thereon from the metal of the blank, inserting the blank in a die recess, the fins acting to center the blank in said recess, and compressing the blank to further shape the same and to merge the metal of the fins into that of the blank.

11. The method of making a castellated nut blank comprising compressing a blank and extruding the locking lugs of the nut to a height greater than that they will occupy in the finished blank and reducing the height of the locking lugs to that they will occupy in the finished blank.

12. The method of making a nut blank comprising shaping a blank and forming centering fins thereon from the metal of the blank, compressing the blank and merging the metal of the fins into that of the blank while extruding the locking lugs of the nut.

WILLIAM McLURE ROSBOROUGH.